Patented July 10, 1951

2,559,805

UNITED STATES PATENT OFFICE 2,559,805

OPAL GLASS COMPOSITION

Stanley Donald Stookey, Corning, N. Y., assignor to Corning Glass Works, Corning, N. Y., a corporation of New York No Drawing. Application July 3, 1947, Serial No. 758,989

7 Claims. (Cl. 106—52)

This invention relates to compositions for opal glasses, that is, glasses which are rendered opaque or light-diffusing by the precipitation and growth of crystallites or other inclusions in the glass by cooling or reheating it. In general, the common opal glasses may be classified as those in which the light-diffusing nuclei are crystallites of precipitated insoluble fluorides or those in which the light-diffusing nuclei are minute droplets having a composition which is immiscible with the glass at certain temperatures. Of the latter type is the glass in which the opacifying agent comprises an alkaline earth phosphate. It is with such glasses, commonly known as "phosphate opals," that the present invention is primarily concerned.

Heretofore the compositions containing fluorides were preferable for the commercial production of opal glasses despite an objectionable tendency for the fluorides to decompose and evaporate during melting with a resulting loss of opacity and corrosion of melting containers and metal parts. For the manufacture of thin opaque tableware, such as dinner plates, teacups, etc., in continuous tanks, the fluoride opal glasses are unsatisfactory. The opacity of such ware varies, due to volatilization losses and the ware may be generally too pale or have pale streaks. When such ware is tempered or strengthened in known manner by sudden controlled cooling from a given temperature, the losses due to breakage are too great for practical purposes on account of the unduly large number of stones which are eroded from the refractories into the glass and which cause severe non-uniform stresses in the ware during tempering.

Phosphate opal glasses contain as an opacifying agent an insoluble phosphate of a metal of the second periodic group which is usually calcium phosphate, known as bone ash. Such insoluble phosphates are stable, non-volatile and non-corrosive, but either they provide insufficient opacity for all purposes or the glasses containing them are brittle. Opal glasses containing calcium phosphate as the opacifying agent are pale compared to fluoride opals and do not become equally opaque even when the content of calcium phosphate is greatly increased. Instead, they become coarse grained or sandy in character and brittle.

Barium phosphate causes opacity substantially as dense as the best fluoride opals, but prior opal glasses containing barium phosphate are unsuitable for use in continuous tank furnaces for the production of thin opaque tableware particularly when it is desired to strengthen such ware by the known tempering process.

I have found that the liquidus of prior opal glasses containing barium compounds and phosphate is too high in relation to their working temperatures. By liquidus I mean the temperature at which separation or precipitation of opacifying agent begins as the molten glass is cooled and in the case of phosphate opal glasses it is the temperature at which molten phosphate becomes insoluble or immiscible in silicate glass and separates therefrom as minute droplets dispersed throughout the glass. Working temperature is the temperature at which the molten glass is held in the melting container just prior to being worked or shaped and cooled. With concentrations of barium phosphate sufficient to cause opacity in relatively thin sections of glass, I have found that the separation of phosphate nuclei in the prior glasses, as a result of their unduly high liquidus, takes place prematurely and the nuclei tend to coalesce and grow to form aggregates in the glass before it can solidify, the aggregates becoming stones in the cooled glass and thereby establishing localized stresses and causing brittleness.

The primary object of this invention is to provide an opal glass which is free from the disadvantages and shortcomings of prior opal glasses.

Another object is to provide a non-corrosive opal glass having a relatively non-volatile opacifier.

Still another object is to provide a phosphate opal glass which is thermally and mechanically strong and opaque in relatively thin section.

A further object is to provide a phosphate opal glass in which the liquidus is below the working temperature of the glass.

Another object is to provide a phosphate opal glass in which the maximum capacity can be attained with a liquidus substantially below the working temperature.

For the production of thin opaque ware from continuous tank furnaces it is necessary to employ an opal glass which contains a non-volatile opacifier and develops uniform capacity of sufficient density for the purpose and which has a liquidus below its working temperature. The latter requirement as to liquidus versus working temperature is highly essential for the production of ware which is to be tempered.

I have found that these requirements are met only by glasses which contain 50% to 70% $SiO_2$, 7% to 15% total alkali metal oxides, ($R_2O$), 5% to 25% BaO, 2% to 10% $P_2O_5$ and 0% to 25% $B_2O_3$ and 0% to 10% $Al_2O_3$, the total $B_2O_3$ and $Al_2O_3$ being not over 25%, the sum of the percentages of BaO and $P_2O_5$ being from 9% to 30%, the ratio $BaO/P_2O_5$ being from 1.5/1 to 4/1, the ratio $R_2O/P_2O_5$ being from 1.1/1 to 4/1, and the ratio $R_2O/BaO+P_2O_5$ being from 0.3/1 to 1.1/1, the glass containing light-diffusing particles of an insoluble phosphate consisting of barium phosphate and being substantially free from compounds of metals of the second periodic group other than barium. The above percentages are expressed in terms of weight percentage. Compositions in which the above recited ratios have values outside of the respective ranges set forth are useless for my purposes. It is advantageous, but not essential, to introduce the BaO and $P_2O_5$ separately into the glass by adding to the batch a compound of barium such as barium carbonate and a compound of phosphorus such as sodium phosphate.

The density of opacity of the new glasses, that is, the amount of barium phosphate which will separate, is a direct function of the total amount of BaO and $P_2O_5$ present therein, other factors remaining constant. However, the liquidus of the glass rises objectionably with too great an increase in the amount of opacifying agent present. I have found that the liquidus is below the working temperature and satisfactory opacity is obtained when the total of the percentages of BaO and $P_2O_5$ is at least 9% but does not exceed 30%.

The ratio of the percentage of BaO to the percentage of $P_2O_5$ must not exceed 4 to 1, but must be at least 1.5 to 1 in order to obtain satisfactory opacity. Optimum opacity results when the ratio corresponds to that of the compound $Ba_2P_2O_7$.

If the total percentage of the alkali metal oxides is too large in comparison with the percentage of $P_2O_5$ or with the total of the percentages of BaO and $P_2O_5$ the opacity of the glass will be objectionably decreased. If, on the other hand, the total percentage of the alkali metal oxides is too small, the liquidus of the glass will be objectionably high. Therefore, the ratio $R_2O/P_2O_5$ must be not greater than 4 to 1 and not less than 1.1 to 1 and the ratio $R_2O/BaO+P_2O_5$ must be not over 1.1 to 1 and not less than .3 to 1. The introduction of boric oxide or alumina appears to have little effect on the opacity provided the former does not exceed 25%, the latter does not exceed 10% and their total does not exceed 25%. Their use is advantageous in the control of the physical properties of the glass.

The presence of substantial amounts of oxides of the metals of the second periodic group other than barium must be avoided in my new glasses and they are substantially free from such oxides and other elements which form insoluble phosphates and which would raise the liquidus of the glass objectionably.

The following compositions, expressed in percent by weight as calculated from their batches, are examples of opal glasses which illustrate but do not limit my invention:

In lieu of $Na_2O$ other alkali metal oxides in equivalent amounts may be employed in the above compositions with equally good results.

Composition 7 is particularly suitable for tank melting and is adapted to either hand working or machine working. The opacity strikes somewhat more slowly in the new glasses than in the prior fluoride opals. This difference is readily compensated by slight change in timing of the pressing or blowing operations.

Among the advantages of the new glasses over prior opal glasses the following may be mentioned: They are superior to the prior phosphate opals because a high density of opacity can be attained while keeping the liquidus temperature sufficiently low to permit working and forming of the glass without excessive growth or coalescence of the opacifying nuclei, thus preventing the formation of stones or the development of mechanical or thermal weakness due to strain centers. They are substantially non-volatile and no appreciable loss of opacity occurs in melting. Their non-corrosive characteristics are good. They also have good chemical stability. Ware made from the new glasses has a highly lustrous surface which is characteristic of barium-containing glasses, and it is free from the flashed rings which are a common fault in ware made of fluoride opal glass. The new glasses are suitable for the production of table ware and the like, and may be tinted by the introduction of known coloring agents in the usual manner.

This application is a continuation-in-part of my copending application Serial No. 497,549 filed August 5, 1943, now abandoned.

I claim:

1. A light-diffusing glass which contains 50% to 70% $SiO_2$, 7% to 15% alkali metal oxide, 5% to 25% BaO, 2% to 10% $P_2O_5$ and up to 25% $B_2O_3$, the sum of the percentages of BaO and $P_2O_5$ being from 9% to 30%, the ratio $BaO/P_2O_5$ being from 1.5/1 to 4/1, the ratio alkali metal oxide $P_2O_5$ being from 1.1/1 to 4/1 and the ratio alkali metal oxide $BaO+P_2O_5$ being from 0.3/1 to 1.1/1, the glass containing light-diffusing particles of an insoluble phosphate consisting of barium phosphate and being substantially free from compounds of metals of the second periodic group other than barium.

2. A light-diffusing glass which contains 50% to 70% $SiO_2$, 7% to 15% alkali metal oxide, 5% to 25% BaO, 2% to 10% $P_2O_5$ and up to 10% $Al_2O_3$, the sum of the percentages of BaO and $P_2O_5$ being from 9% to 30%, the ratio $BaO/_2O_5$ being from 1.5/1 to 4/1, the ratio alkali metal oxide/$P_2O_5$ being from 1.1/1 to 4/1 and the ratio alkali metal oxide/$BaO+P_2O_5$ being from 0.3/1 to 1.1/1, the glass containing light-diffusing particles of an insoluble phosphate consisting of barium phosphate and being substantially free from compounds of metals of the second periodic group other than barium.

3. A light-diffusing glass which consists ap-

|  | 1 | 2 | 3 | 4 | 5 | 6 | 7 | 8 |
|---|---|---|---|---|---|---|---|---|
| $SiO_2$ | 60 | 50 | 55 | 65 | 70 | 67 | 57 | 55 |
| $Na_2O$ | 10 | 15 | 14 | 15 | 10 | 10 | 10 | 13 |
| BaO | 10.5 | 13.5 | 19 | 14 | 7 | 13 | 13 | 14 |
| $P_2O_5$ | 4.5 | 6.5 | 9 | 6 | 3 | 5 | 5 | 8 |
| $B_2O_3$ | 10 | 15 | 1.5 |  | 10 |  | 7 | 5 |
| $Al_2O_3$ | 5 |  | 1.5 |  |  | 5 | 8 | 5 |
| $BaO/P_2O_5$ | 2.3 | 2.1 | 2.1 | 2.3 | 2.3 | 2.6 | 2.6 | 1.75 |
| $R_2O/P_2O_5$ | 2.2 | 2.3 | 1.5 | 2.5 | 3.3 | 2.0 | 2.0 | 1.6 |
| $R_2O/BaO+P_2O_5$ | .67 | .75 | .5 | .75 | 1.0 | .55 | .55 | .59 | proximately of 60% $SiO_2$, 10% $Na_2O$, 10.5% $BaO$, 4.5% $P_2O_5$, 10% $B_2O_3$, and 5% $Al_2O_3$.

4. A light diffusing glass which consists approximately of 57% $SiO_2$, 10% $Na_2O$, 13% $BaO$, 5% $P_2O_5$, 7% $B_2O_3$ and 8% $Al_2O_3$.

5. A light diffusing glass which consists approximately of 55% $SiO_2$, 13% $Na_2O$, 14% $BaO$, 8% $P_2O_5$, 5% $B_2O_3$ and 5% $Al_2O_3$.

6. A light-diffusing glass which contains 50% to 70% $SiO_2$, 7% to 15% alkali metal oxide, 5% to 25% $BaO$ and 2% to 10% $P_2O_5$, the sum of the percentages of $BaO$ and $P_2O_5$ being from 9% to 30%, the ratio $BaO/P_2O_5$ being from 1.5/1 to 4/1, the ratio alkali metal oxide/$P_2O_5$ being from 1.1/1 to 4/1 and the ratio alkali metal oxide/$BaO+P_2O_5$ being from 0.3/1 to 1.1/1, the glass containing light-diffusing particles of an insoluble phosphate consisting of barium phosphate and being substantially free from compounds of metals of the second periodic group other than barium.

7. A light-diffusing glass comprising 50% to 70% $SiO_2$, 7% to 15% alkali metal oxide, 5% to 25% $BaO$, 2% to 10% $P_2O_5$, and the indicated amount of at least one oxide selected from the group consisting of up to 25% $B_2O_3$ and up to 10% $Al_2O_3$, the total $B_2O_3$ and $Al_2O_3$ being not over 25%, the total $BaO$ and $P_2O_5$ being from 9% to 30%, the ratio $BaO/P_2O_5$ being from 1.5/1 to 4/1, the ratio alkali metal oxide/$P_2O_5$ being from 1.1/1 to 4/1, and the ratio alkali metal oxide/$BaO+P_2O_5$ being from 0.3/1 to 1.1/1, the glass containing light-diffusing particles of an insoluble phosphate consisting of barium phosphate and being substantially free from compounds of metals of the second periodic group other than barium.

STANLEY DONALD STOOKEY.

REFERENCES CITED

The following references are of record in the file of this patent:

UNITED STATES PATENTS

| Number | Name | Date |
|---|---|---|
| 2,394,502 | Weyl et al. | Feb. 5, 1946 |

FOREIGN PATENTS

| Number | Name | Date |
|---|---|---|
| 166,672 | Germany | 1905 |
| 186,423 | Germany | 1907 |
| 580,027 | Great Britain | 1946 |

Certificate of Correction

Patent No. 2,559,805                                          July 10, 1951

STANLEY DONALD STOOKEY

It is hereby certified that error appears in the printed specification of the above numbered patent requiring correction as follows:

Column 2, lines 38 and 44, for "capacity" read *opacity*; column 3, line 13, for "purposes" read *purpose*;

and that the said Letters Patent should be read as corrected above, so that the same may conform to the record of the case in the Patent Office.

Signed and sealed this 20th day of November, A. D. 1951.

[SEAL]

THOMAS F. MURPHY,
*Assistant Commissioner of Patents.*